(12) United States Patent
Wambacq

(10) Patent No.: US 8,532,226 B2
(45) Date of Patent: Sep. 10, 2013

(54) EHF WIRELESS COMMUNICATION RECEIVER USING BEAMFORMING WITH A SCALABLE NUMBER OF ANTENNA PATHS

(75) Inventor: Piet Wambacq, Groot-Bijgaarden (BE)

(73) Assignee: IMEC, Leuven (BE)

( * ) Notice: Subject to any disclaimer, the term of this patent is extended or adjusted under 35 U.S.C. 154(b) by 97 days.

(21) Appl. No.: 13/380,135

(22) PCT Filed: Jun. 23, 2010

(86) PCT No.: PCT/EP2010/058882
§ 371 (c)(1),
(2), (4) Date: Jan. 26, 2012

(87) PCT Pub. No.: WO2010/149689
PCT Pub. Date: Dec. 29, 2010

(65) Prior Publication Data
US 2012/0121043 A1 May 17, 2012

Related U.S. Application Data

(60) Provisional application No. 61/269,429, filed on Jun. 23, 2009.

(30) Foreign Application Priority Data

Jan. 29, 2010 (EP) .................................... 10152098

(51) Int. Cl.
*H03D 3/22* (2006.01)
(52) U.S. Cl.
USPC .......... 375/330; 375/324; 375/327; 375/260; 375/262; 375/265; 375/267; 375/340; 375/343; 375/346; 375/347
(58) Field of Classification Search
USPC ................. 370/203, 204, 205, 208, 209, 210; 375/260, 262, 265, 267, 324, 327, 330, 343, 375/346
See application file for complete search history.

(56) References Cited

U.S. PATENT DOCUMENTS 7,386,286 B2 * 6/2008 Petrovic et al. ............ 455/165.1
8,085,877 B2 * 12/2011 Rofougaran .................. 375/324

(Continued)

OTHER PUBLICATIONS

"Part 15.3: Wireless Medium Access Control (MAC) and Physical Layer (PHY) Specifications for High Rate Wireless Personal Area Networks (WPANs)", IEEE Std. 802.15.3c, 2009, 203 pages.

(Continued)

*Primary Examiner* — Dhaval Patel
(74) *Attorney, Agent, or Firm* — McDonnell Boehnen Hulbert & Berghoff LLP

(57) ABSTRACT

The invention relates to a EHF wireless communication receiver comprising a phased array radio arranged for receiving a beam of signals in a predetermined frequency band. The phased array radio comprises a plurality of antenna paths, each arranged for handling one of the incoming signals and forming a differential I/Q output signal, each antenna path comprises a downconversion part and a phase shifting part for applying a controllable phase shift; a signal combination circuitry is connected to the antenna paths and is arranged for combining the differential I/Q output signals; and a control circuitry is connected to the phase shifting parts of the antenna paths and is arranged for controlling the controllable phase shift. In each antenna path, the phase shifting part is a baseband part downstream from the downconversion part and the phase shifting part comprises a set of variable gain amplifiers arranged for applying controllable gains to the respective downconverted incoming signals in the I/Q branches. The control circuitry sets the controllable gains of the variable gain amplifiers to coefficients of a rotational matrix.

20 Claims, 11 Drawing Sheets

(56) References Cited

U.S. PATENT DOCUMENTS

2003/0219082 A1* 11/2003 Tanaka et al. ............... 375/324
2006/0239372 A1    10/2006 Kim

OTHER PUBLICATIONS

"High Rate 60 GHz PHY, MAC and HDMI PAL", Final Draft Standard, ECMA, Ecma/TC4812008/144, 339 pages.

Borremans et al., "A Digitally Controlled Compact 57-to-66GHz Front-End in 45nm Digital CMOS," Solid-State Circuits Conference, Digest of Technical Papers, IEEE International, Feb. 8, 2009, pp. 492-493.

Fitzsimmons et al., "A Connectorless Module for an EHF Phased-Array Antenna," Microwave Journal, vol. 37, No. 1, Jan. 1, 1994, p. 126.

International Search Report, International Application No. PCT/EP2010/58882 dated Aug. 12, 2010.

* cited by examiner

EHF WIRELESS COMMUNICATION RECEIVER USING BEAMFORMING WITH A SCALABLE NUMBER OF ANTENNA PATHS

CROSS-REFERENCE TO RELATED APPLICATIONS

The present application is a U.S. national stage application of International Patent Application No. PCT/EP2010/058882 filed Jun. 23, 2010, which claims priority to European Patent Application No. 10152098.9 filed Jan. 29, 2010 and U.S. Provisional Application 61/269,429 filed Jun. 23, 2009.

TECHNICAL FIELD

The present invention relates to an extremely high frequency (EHF) receiver according to the preamble of claim 1.

BACKGROUND ART

Extremely high frequency (EHF) is the highest radio frequency band, covering the range of frequencies from 30 to 300 GHz. Compared to wireless applications operating below this band, the free space path loss is much higher. Hence, antenna arrays with beamforming are used to achieve transmission over a longer distance.

Within the EHF band, a 7 GHz band around 60 GHz is envisaged for different emerging wireless communication applications. The number of antenna paths can be different for different applications. For distances up to 10 meter (e.g. transfer of HDTV data between a HDTV and a high-definition DVD player) an array of 16 antennas might be needed. For distances up to a few meters, less antenna paths (e.g. four) might be enough. A number of N antennas corresponds in the receiver to N antenna paths, which need to be combined. It is a challenge to combine so many paths without loss of performance.

DISCLOSURE OF THE INVENTION

It is an aim of this invention to provide an EHF wireless communication receiver in which the signals received on the different antenna paths can be combined with less performance degradation and lower power consumption than existing combination methods, which usually combine signals at high frequencies.

According to the invention, this aim is achieved with the EHF wireless communication receiver showing the characteristics of the first independent claim.

It is a further aim of this invention to provide a method for receiving an EHF wireless communication signal in which the signals received on the different antenna paths can be combined with better performance.

According to the invention, this further aim is achieved with the method performing the steps of the second independent claim.

In the EHF wireless communication receiver and method of the invention, the beamforming operations (phase shifting and signal combination) are performed after downconversion, i.e. at analog baseband. It has been found that this can improve performance in view of reduced losses over the parasitic capacitances and inductances of the circuitry. Furthermore, performing these operations at baseband is found to be advantageous in terms of power consumption, in view of the lower frequency at which the operations are performed.

The architecture of the present invention has the advantage of being scalable with respect to the number of antenna paths.

In the EHF wireless communication receiver and method of the invention, the phase shifting is implemented by means of a set of variable gain amplifiers arranged for applying controllable gains to the respective downconverted incoming signals in the I/Q branches of each antenna path. The control circuitry is arranged for setting the controllable gains of the variable gain amplifiers to values that are proportional to the coefficients of a rotational matrix, by means of which the determined phase shift to achieve beamforming is applied to the respective incoming signal in the respective antenna path. This may or may not involve adding gain to the respective incoming signal on top of applying the phase shift.

In preferred embodiments, the downconversion part is a direct downconversion part equipped for downconverting the incoming signal to baseband in a single step.

In preferred embodiments, the phased array radio comprises multiple phase-locked loops (PLL) synchronized with each other, each phase-locked loop being connected to the downconversion part of at least one antenna path and being provided for generating a local oscillation signal therefor. The voltage-controlled oscillator (VCO) at the output of such PLL is a quadrature VCO (QVCO) that provides differential quadrature signals, which are needed for direct downconversion. The use of multiple phase-locked loops has the advantage over a common phase-locked loop for all antenna paths that the specifications on the PLL phase noise can be relaxed. For example in the case that every antenna path has its own PLL, the phase noise contributions from each VCO, which are uncorrelated, can be averaged out, as the signal distortions caused by phase noise do not combine constructively.

Preferably, each phase-locked loop is connected to the downconversion part of at least two antenna paths, to optimally trade off phase noise performance and LO buffering requirements with power and area consumption.

In preferred embodiments, signal repeaters are inserted in between two parts of the interconnect lines bridging the distance between the antenna paths and the place where the signals of the different antenna paths are combined. The signal repeaters may be current amplifiers. In this way, it can be avoided that the distance that must be bridged on the chip by combining many antenna paths limits the bandwidth. Thanks to the low input impedance of these current amplifiers the pole caused by the real part of the input impedance and the parasitic capacitance of the interconnect lines can be put easily beyond the bandwidth of the baseband signal. As a result, the architecture of the present invention is scalable with respect to the number of antenna paths as it is suitable for extension to many antenna paths without loss of performance due to the overhead of connecting many antenna paths together.

In preferred embodiments, the receiver is arranged for AV-OFDM communication in the band around 60 GHz.

BRIEF DESCRIPTION OF THE DRAWINGS

The invention will be further elucidated by means of the following description and the appended drawings.

MODES FOR CARRYING OUT THE INVENTION

Figure 1:
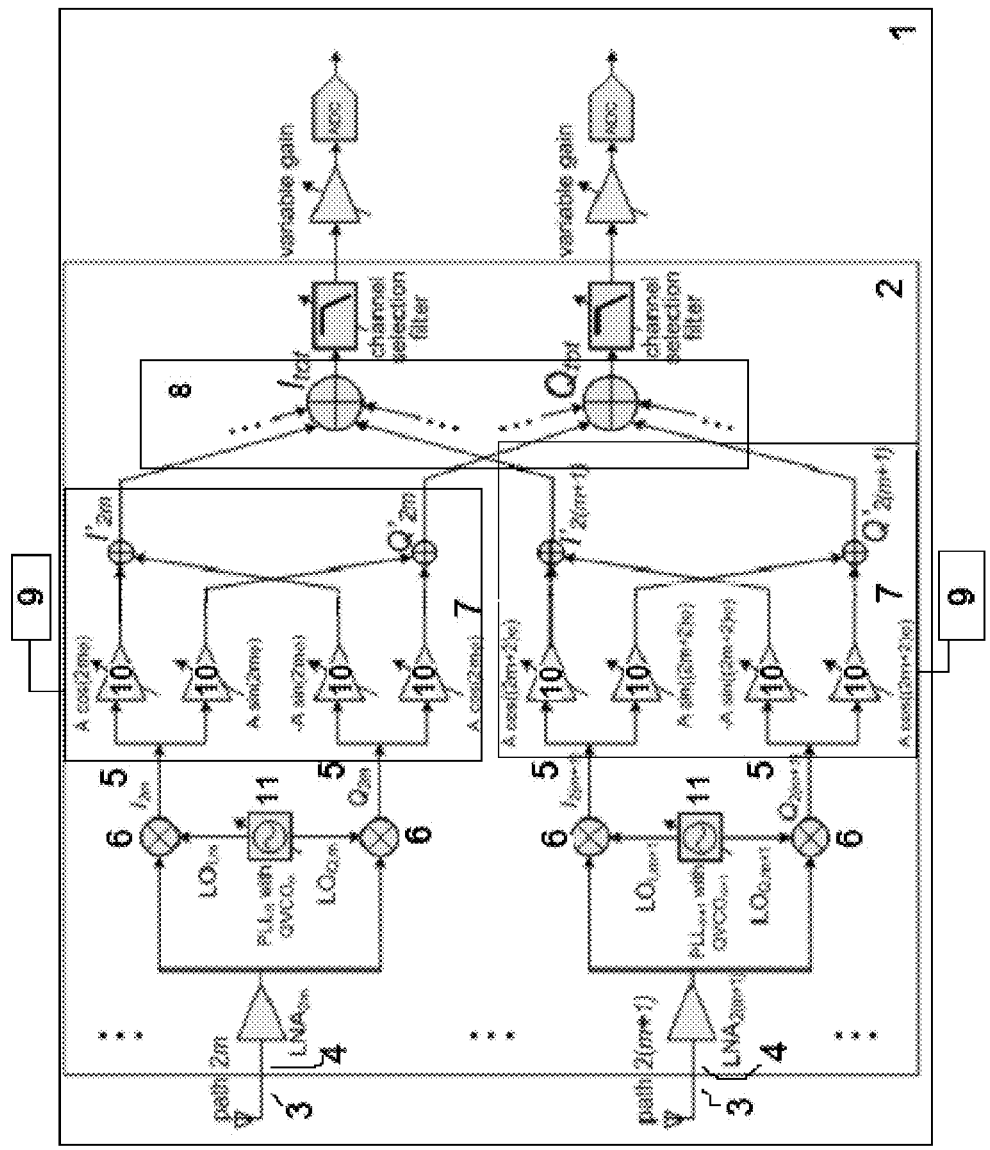
FIG. 1 shows a receive architecture.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In particular, the invention presents a device and method for receiving RF signals within the EHF band, preferably the band around 60 GHz, in which beamforming is used. The idea is to perform the beamforming operations (phase shifting and signal combination) at analog baseband. Compared to beamforming operations at RF, beamforming operations at baseband are cheaper in terms of power consumption and give less performance degradation. Preferably, performance degradation as a result of the distance that must be bridged on the chip in the case of a large number of antenna paths is avoided by using current amplifiers in between long lines. The bandwidth limitations due to the parasitic capacitance of the long lines, are overcome thanks to the low input impedance of the current amplifiers: the real part of that impedance forms a pole with the interconnect capacitance that is beyond the envisaged signal bandwidth.

Because the beamforming operations are performed at baseband, downconversion circuit parts are required in each antenna/signal path, which are preferably downconversion mixers which rely on local oscillator signals. The problem of distribution of a common local oscillator signal is circumvented by using multiple phase-locked loops (PLLs), e.g. one PLL per two antenna paths. The different PLLs are synchronized with respect to each other by using the same reference frequency signal. This is a low-frequency signal that can be distributed easily over long distances, which is needed in the case of many antenna paths. This approach gives less performance degradation than the use of one central PLL, which requires the distribution of a high-frequency local oscillator signal to many antenna paths (over a long distance on the chip).

The invention will be exemplified below by a receiver design in 40 nm CMOS comprising four antenna paths but is not limited hereto. For mm-wave applications, the CMOS technologies that can be used are the 90 nm generation or below. These generations feature transistors that are fast enough to properly handle millimeter-wave signals. In the example implementation 40 nm CMOS is used. The example contains the circuitry between LNA inputs up to the output of the analog baseband filters for channel selection. The beamforming is implemented by phase shifting and signal combination at analog baseband. The downconversion is performed in one step (zero-IF).

The performance of the different building blocks has been made digitally programmable with a so-called network on chip. With a conversion gain setting of around 30 dB, the noise figure of the receiver chip is around 8.5 dB (it changes slightly with frequency). The power consumption of the receiver chip is 398 mW. With this noise figure and when taking into account signal degradations of the antenna interface and the receive blocks behind the analog baseband filters (namely variable-gain amplifier (VGA) and the analog-to-digital converter (ADC) that has been designed standalone in e.g. 40 nm process) then with a QAM16 modulation on the OFDM carriers (requiring a signal-to-noise ratio of 20.5 dB) the complete receiver has a sensitivity level better than −50 dBm, which is the value prescribed in the 802.15.3c standard for AV-OFDM. When the power consumption of the ADC and an estimate for the VGA is taken into account, then the total receiver consumes 422 mW. From this consumption 27% goes to LO buffering. Further simulations have shown that the power consumption of this buffering can be with 79 mW while maintaining a large output swing. This brings the power consumption of the complete receiver to 343 mW.

The architecture of the proposed invention shows a high degree of scalability of the receiver in terms of the number of antenna paths.

A technology that can be used is a 40 nm digital CMOS technology. It uses seven metal levels (copper) and a thick top aluminum layer.

The receive architecture is shown in FIG. 1. An EHF wireless communication receiver (1) comprises a phased array radio (2) arranged for receiving a beam of incoming signals (4) in a predetermined frequency band within the EHF range. The radio (2) comprises a plurality of antenna paths (3), each handling one of the incoming signals (4) and forming a differential I/Q output signal (5) from the incoming signal. Each antenna path comprises I and Q branches with a downconversion part (6) for downconverting the incoming signal to baseband and a phase shifting part (7) for applying a controllable phase shift to the incoming signal. The radio (2) further comprises signal combination circuitry (8) connected to the antenna paths and arranged for combining the differential phase-shifted I/Q output signals to a combined differential I/Q signal and control circuitry (9) connected to the phase shifting parts of the antenna paths and arranged for controlling the controllable phase shift. The phase shifting part comprises a set of variable gain amplifiers (10) arranged for applying controllable gains to the respective downconverted incoming signals in the I/Q branches. The receiver architecture uses direct downconversion. The beamforming is performed after direct downconversion, in the analog baseband part, where the incoming signal is present in differential I/Q format. If this operation would be performed at RF then first an I/Q signal needs to be generated, requiring extra circuitry such as a quadrature all-pass filter.

The phase shifting is performed by multiplying the I signal and the Q signal (5) with appropriate sines and cosines of the wanted phase shift $\phi$, resulting in new, phase-shifted I and Q values. Indeed, denoting the I and Q values after phase shifting by I' and Q', they can be related to the original I and Q values as follows:

$$I'=\cos(\phi)I-\sin(\phi)Q$$

$$Q'=\sin(\phi)I+\cos(\phi)Q \quad (1)$$

This operation is applied to any I and Q baseband signal (5) of every antenna path (3). It is implemented using amplifiers (10) with a gain that is digitally controllable. An on-chip calibration of the phase shift is provided as well. As the output of the downconversion mixers is a current, the variable-gain amplifiers are implemented as current amplifiers. Further, some extra gain can be added to increase the signal strength at this point. This is implemented by introducing a common scale factor A in equation (1):

$$I'=A\cos(\phi)I-A\sin(\phi)Q$$

$$Q'=A\sin(\phi)I+A\cos(\phi)Q \quad (2)$$

This can be written in the form of a rotational matrix:

$$\begin{bmatrix} I' \\ Q' \end{bmatrix} = \begin{bmatrix} A\cos(\varphi) & -A\sin(\varphi) \\ A\sin(\varphi) & A\cos(\varphi) \end{bmatrix} \times \begin{bmatrix} I \\ Q \end{bmatrix} \quad (3)$$

After phase shifting, all new I' signals are summed (8), just as all new Q' signals. This summation is performed in the current domain (a summation of currents). Such summation can be made more linear than a summation of voltages.

Beamforming at analog baseband has advantages compared to beamforming operations (phase shift and summation) at RF, especially for many antenna paths. Indeed, for many antenna paths the distance between the phase shifted signals—no matter how this phase shift is implemented—and the combined output(s) is inevitably large. Bridging this distance at high frequencies can be lossy and/or power hungry when long transmission lines need to be driven, which may require several signal repeaters operating at high frequencies, which may consume much power. Furthermore, such repeaters use resonant loads which can have a passband that can be shifted in frequency by process tolerances and/or small parasitics. This can give rise to loss.

Compared to phase shifting at RF, baseband phase shifting is more robust and compact. Indeed, at baseband there is no need for resonant circuits with bulky inductors or transmission lines. Furthermore, modeling errors on the parasitics from interconnect and from the different components play a minor role. Indeed, a few femtofarads of difference between modeling/simulation and the reality can be neglected at baseband. This makes the performance of analog baseband circuitry more predictable than mm-wave circuitry, which is also an objective advantage over phase shifting in the LO path.

The analog baseband part has been designed to account for the possibility of channel bonding with two channels. To this end, the bandwidth of the circuits has been made programmable.

To relieve the specifications on the PLL phase noise, more than one PLL (11) is used. Assume that every antenna path has its own PLL (11). In that case, the phase noise contributions from each VCO, which are uncorrelated, can be averaged out, as the signal distortions caused by phase noise do not combine constructively at signal combination. A similar reasoning is valid for other noise sources in the PLL, except for the upconversion of phase noise from the reference frequency, which is common to all PLLs. However, as phase noise of a 60 GHz PLL is not dominated by upconverted reference noise, the averaging still has effect, giving a phase noise reduction with a factor $10*\log_{10}(N)$, N being the number of antenna paths.

To optimally trade off phase noise performance and LO buffering requirements with power and area consumption, one can use less than N PLLs. In the receiver chip one PLL per two antenna paths is used. The four antenna paths are grouped two by two, which is in correspondence with the floorplan of the example implementation in 40 nm CMOS (see FIG. 6). On the chip layout two antenna paths are grouped in the north of the chip (antenna path one handling $RF_{in1}$ and two handling $RF_{in2}$) and two in the south of the chip (antenna path three and four). In the following sections, the different building blocks will be briefly discussed.

The implemented receiver has four antenna paths which are combined at baseband, two baseband filters (namely for the combined I-path and the combined Q-path) and two PLLs. The building blocks that belong to antenna path i (i=1, ..., 4) get i as a suffix. For example, LNA3 means the low-noise amplifier in antenna path 3. Further, the two PLLs are indicated with PLL12 (belonging to antenna paths 1 and 2) and PLL34 (belonging to antenna paths 3 and 4). The building blocks of one those two PLLs also get the suffix 12 and 34, respectively.

The required phase shift to be applied in the different antenna paths is determined in an initial step by means of procedures known to the person skilled in the art, in particular at the MAC (Medium Access Control) layer and then passed to the physical layer. This is described in [1] and [2]:
1. IEEE 802.15 WPAN Millimeter wave alternative PHY task group 3c (TG3c), http://www.ieee802.org/15/pub/TG3c.html.
2. Ecma TC48 draft standard for high rate 60 GHz WPANs, Ecma/TC48/2008/144, http://www.ecma-international.org/publications/files/drafts/tc48-2008-144.pdf.

Network on Chip

To program the different analog blocks and to overcome variability issues, a network-on-chip (NOC) can be implemented. This is a master-slave system, in which the master (31) is connected to the pins (32) of the chip via which the control can be brought onto the chip, while there are slave nodes (34) corresponding to a large unit of analog circuitry. The slave nodes (34) are put in a ring, which in turn is connected to the master node (31) (see FIG. 2). Via a serial communication the bits can be transported to the appropriate slave nodes. These slave nodes (34) are digital circuits with output lines that go to the analog circuits (35). The control by the bits corresponding to these lines has been implemented in different ways, depending on the requirements in the circuit. Sometimes a digital-to-analog converter (DAC) is used. Another possible implementation of digital control is the use of different parallel transistors in the signal path, each transistor having a different width while the widths differ from each other with a factor of two.

Figure 2:
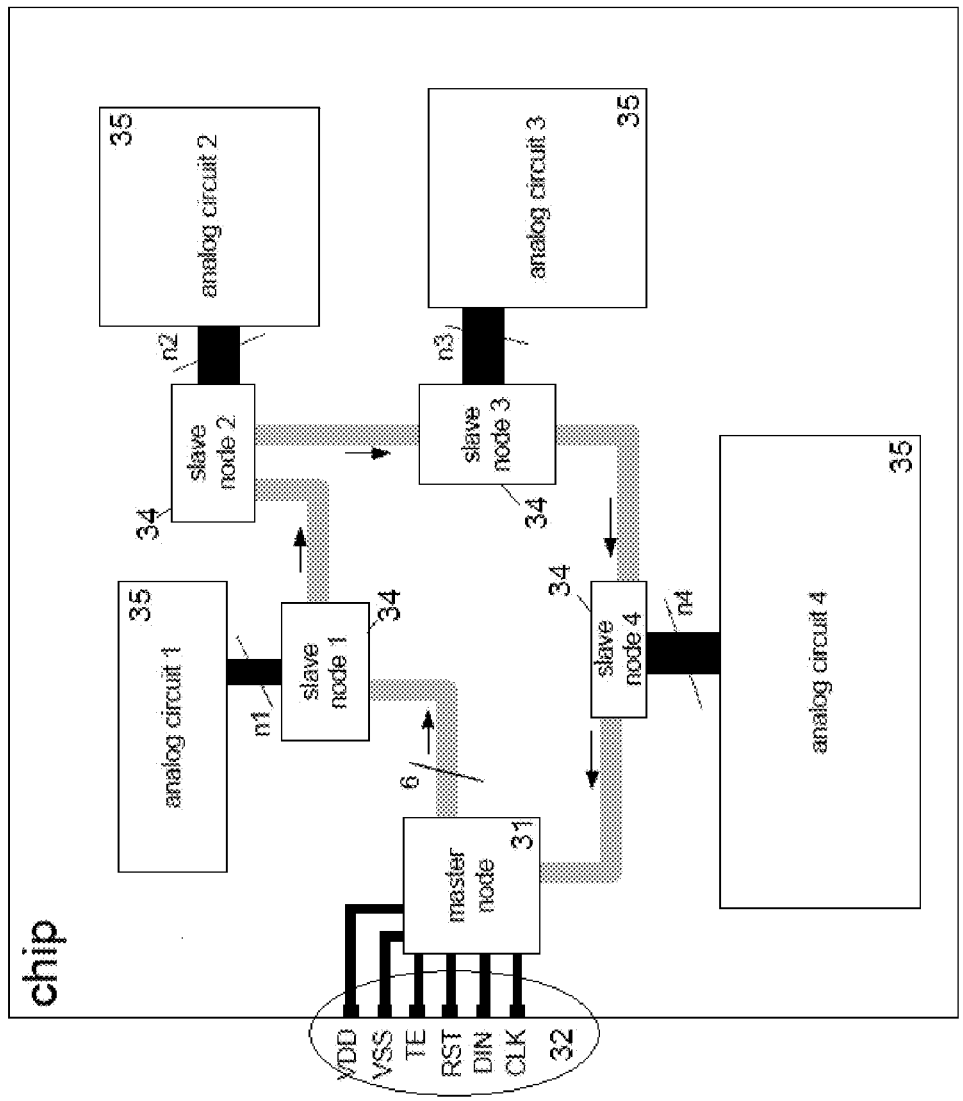
FIG. 2 illustrates the concept of the network on chip.
Figure 3:
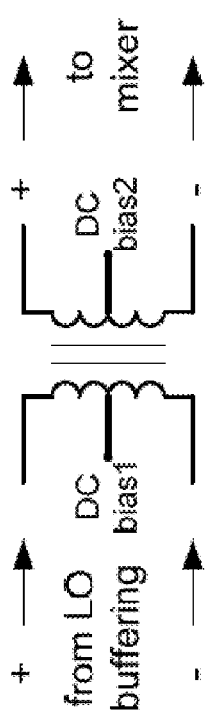
FIG. 3 shows a transformer used to couple the LO buffering and the mixer.

The NOC is schematically shown in FIG. 2. Only six bond pads (32) are needed for the NOC: digital VDD (1.1 V) and ground, a serial data input (DIN in FIG. 2), a clock line (CLK), a reset (RST) and a transfer enable line (TE). The digital I/O pads need two more extra bond pads, namely the power and ground connection for the 2.5 V power domain that is only used in the digital I/Os. The six lines are distributed to the different slave nodes (34), that are connected in a ring structure. Slave node i has n, connections to the analog circuits (35).

The layout of the master (31) and the slave nodes (34) has been generated with a digital design flow that takes as an input a bounding box for the layout as well as bit lines with names, which will be the control lines for the analog circuits (35). For each slave node (34) a set of spare bits is provided, in order to allow for extra control bits which were not foreseen during specification of the NOC at the beginning of the digital synthesis.

In the proposed version of the NOC only bits can be entered into the chip. If desired, other solutions can be implemented (e.g. reading out bits), such as the use of shift registers, as implemented for the calibration of the phase shifters.

Phase Shifters, Signal Combiners and Repeaters

Figure 4:
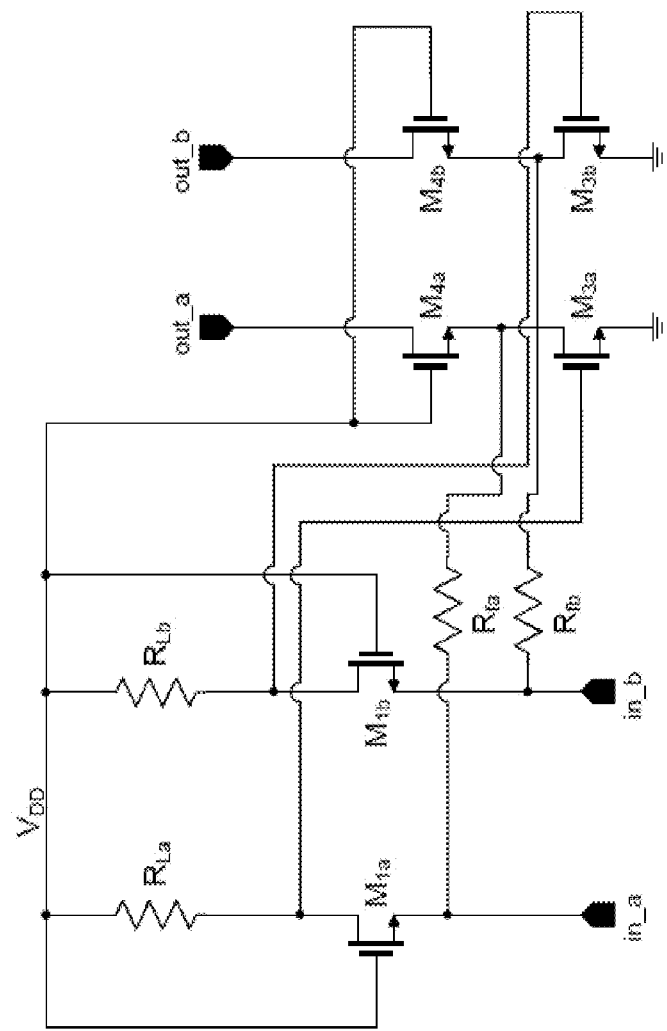
FIG. 4 shows a simplified schematic of the current amplifier used in the phase sifters, signal combiners and baseband signal repeaters.

The phase shifters comprise current amplifiers with variable gain. The same schematic of the current amplifier is reused everywhere. They have a low input impedance and a high output impedance. The input (in_a and in_b) of such current amplifier (see FIG. 4) is a common-gate stage (transistors $M_{1a}$ and $M_{1b}$). The input impedance of the common-gate stage, which is already low, is further lowered by an extra shunt feedback at the input (via resistors $R_{fa}$ and $R_{fb}$). The output impedance is high by the use of a cascode stage at the output.

Figure 5:
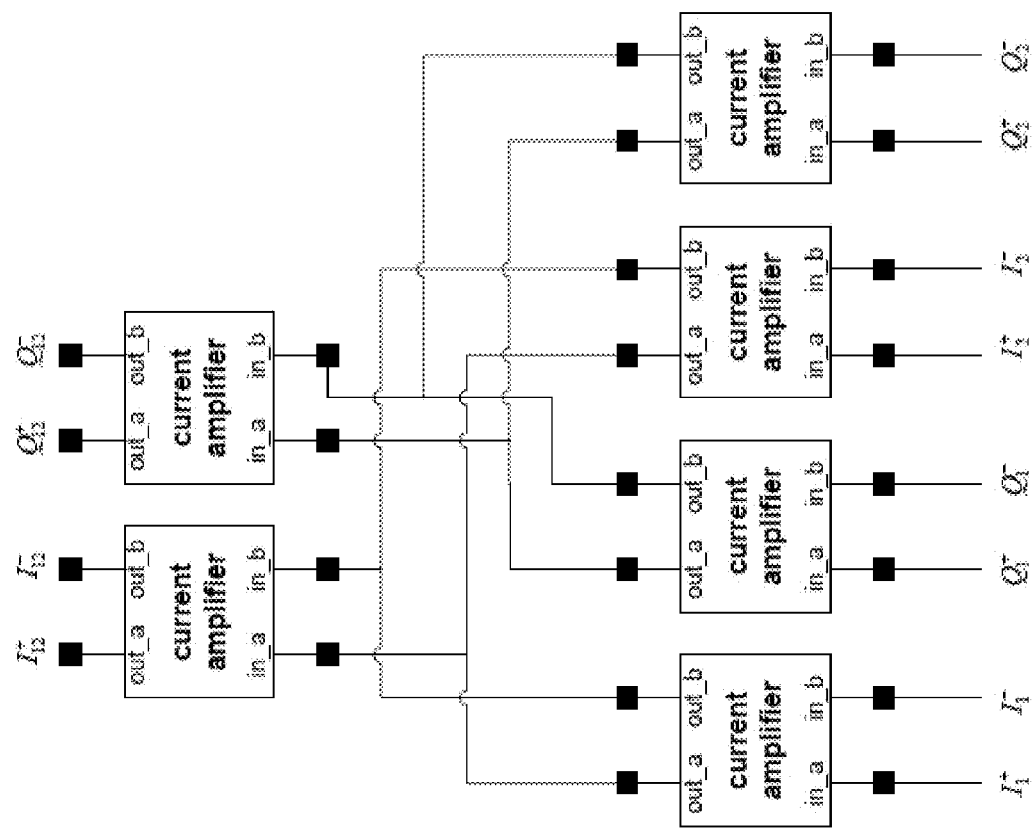
FIG. 5 illustrates the principle of signal combination.

The combination or summation of signals is performed by summing currents, in front of the input of a current amplifier, as shown schematically in FIG. 5.

Figure 6:
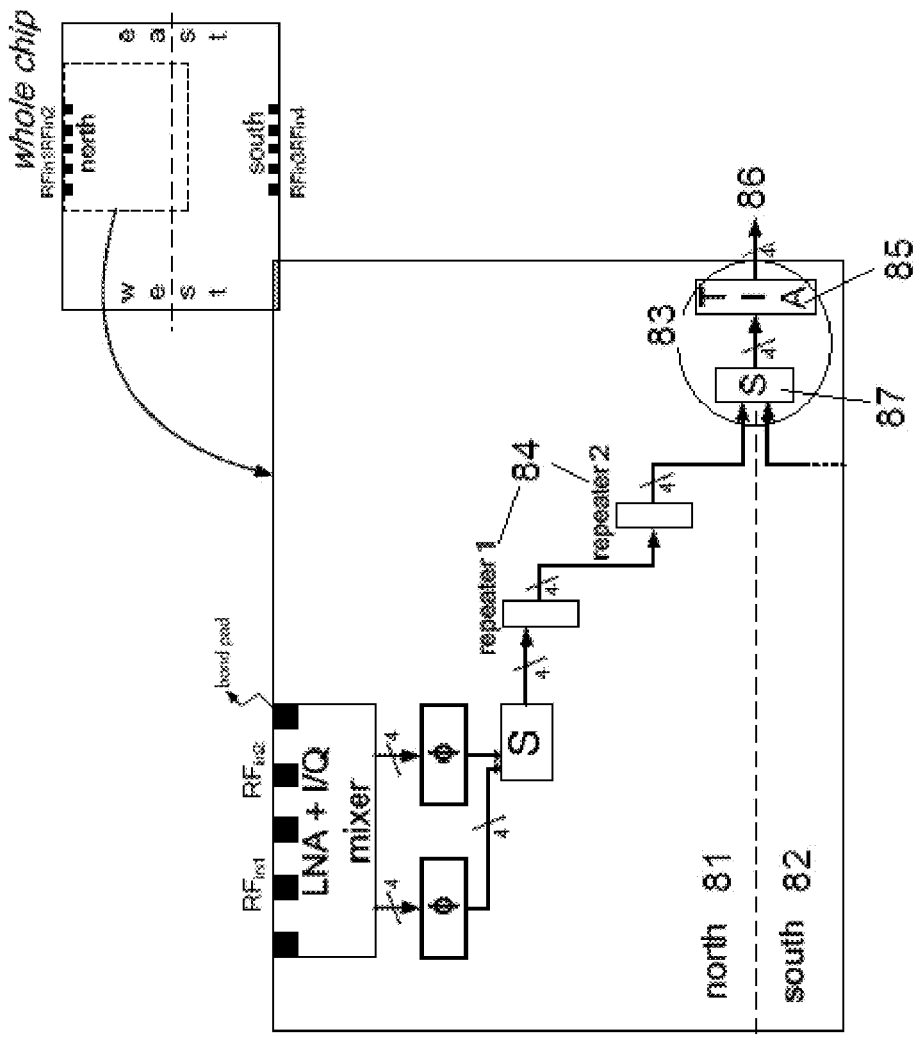
FIG. 6 shows part of the floorplan.

A part of the floorplan of the chip is shown in FIG. 6. The RF input signals from the four antennas enter the chip via two sides: north (81) and south (82). The four signal paths are combined in two stages. Each stage combines two signals (=currents) that are in differential quadrature format. This means that in the first combiner stage, the signals from path 1 and 2 are combined (=in the north) while in the south of the chip paths 3 and 4 are combined. The second combiner stage (83) sums the combined signals from the north and the south that result from the first combiner stage. There is an unavoidable and considerable distance between the RF inputs and the inputs at baseband to the channel selection filters. In the floorplan, this distance, giving rise to unavoidable long interconnects in the signal path, is bridged at low frequencies rather than at mm-wave frequencies. This has advantages in terms of power consumption, area and robustness. As the signals are at baseband at that stage, no transmission line modelling needs to be taken into account. The impact of the parasitic capacitance of this interconnect on the bandwidth of the analog baseband part is minimized by the low input impedance $R_{in, current\ amp}$ of the current amplifiers. Indeed, the pole at the input of a current amplifier which is located at the end of a long interconnection line, is given by $$\text{pole} = \frac{1}{R_{in, current\ amp}(C_{in, current\ amp} + C_{interconnect})} \quad (4)$$

and this shifts to higher frequencies when $R_{in, current\ amp}$ is lowered.

To further maintain the bandwidth, while bridging a long distance with signal lines, baseband signal repeaters (84) are preferably inserted in the signal path. These repeaters are preferably current amplifiers with a low input impedance.

After the second repeater there is the second combiner stage (83): the signals from the northern and the southern part of the chip are summed in the current domain and then fed into a transimpedance amplifier (TIA), (85). This has a low input impedance and low output impedance. The four lines at the output of the TIA (I+, I−, Q+ and Q−) are fed to the channel selection filters (86). The combiner of path one and two in FIG. 6 is again a current amplifier at the input of which two lines, each carrying the signal current from an antenna path, are connected together. The summing block (87) in FIG. 6 that combines the lines from the north and the south part is also implemented by connecting two lines together. This means that the signal path between the output of a phase shifter and the analog baseband filters beyond the beamforming circuitry comprises three current amplifiers, each connected with long interconnect lines. This idea can be generalized, i.e. it is not restricted to three current amplifiers. The number of current amplifiers depends on the distance that needs to be bridged and the parasitic capacitance per unit length of the interconnection lines.

The channel selection filters (86) are for example fifth-order Butterworth filters based on Sallen-Key biquads. These use unity-gain amplifiers, which comprise a low-gain differential pair followed by a super-source follower. The cutoff frequency can have two values, 875 MHz and 1750 MHz, depending on whether one single channel is used or two channels are bonded together.

To calibrate (and/or debug) the phase shifters, a built-in self test (BIST) block is provided. The calibration block contains a replica of a phase shifter and a transimpedance amplifier. When the parts of the calibration block are calibrated appropriately, then the same settings are used for the corresponding blocks in the signal path.

The calibration block uses a shift register from which data can be read. This is done by bringing a serial line off chip. To save bondpads, this serial line is multiplexed with other digital signals that are brought off chip, namely the divider outputs (at the same frequency of the reference frequency of the PLLs) of the two PLLs. The clock and other control signals for the shift register come from the NOC.

In the calibration block, comparators are connected to each analog node in this block to output the DC operating points of the circuits. Each comparator produces a digital output which is then put to the shift register. A comparison is made between the circuit node voltage and an external reference voltage. By sweeping the external voltage and outputting the comparison result, it is possible to obtain the DC operating point of all nodes simultaneously. The input capacitance of the comparator is just the capacitance of a small inverter and therefore is negligible in the signal path.

Simulation Results: Conversion Gain

Figure 7:
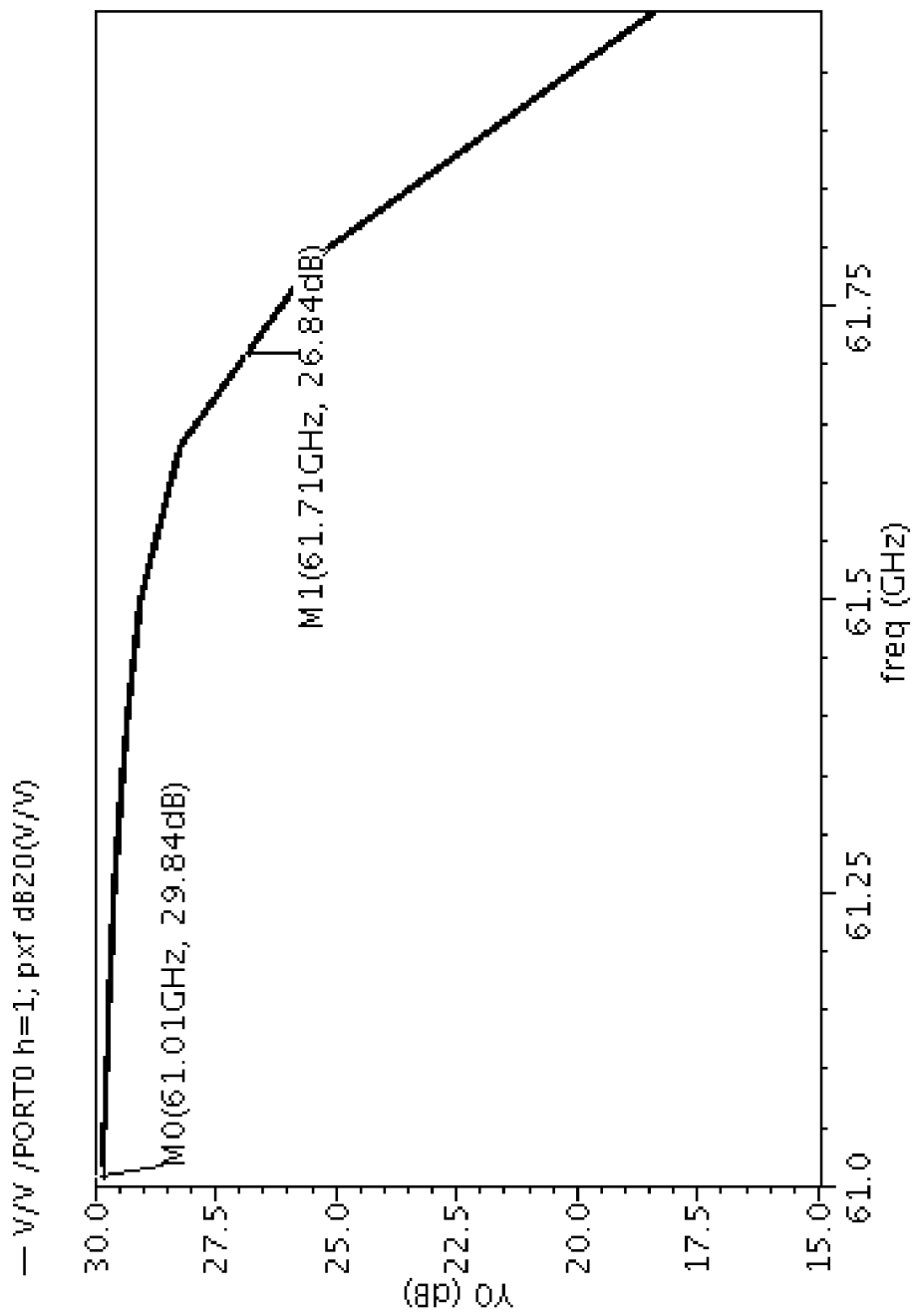
FIG. 7 plots conversion gain as a function of RF frequency.

The conversion gain has been simulated with in Spectre RF. For this simulation the noise and mixer have been put in the highest gain mode while the subsequent circuitry in which gain can still be made (from the phase shifters to the input of the channel selection filters) has been programmed such that the gain in that circuitry is 0 dB. Only one antenna path has been simulated. The resulting conversion gain is shown in FIG. 7. For this simulation the LO frequency has been put to 61 GHz. It is found that the 3 dB bandwidth is around 700 MHz. It is mainly due to the non-flatness of the LNA gain.

This will be improved in a further design. For this simulation the LO signal has been directly applied to the mixer input amplitude in this setup is 1 V single-ended peak to peak.

Figure 8:
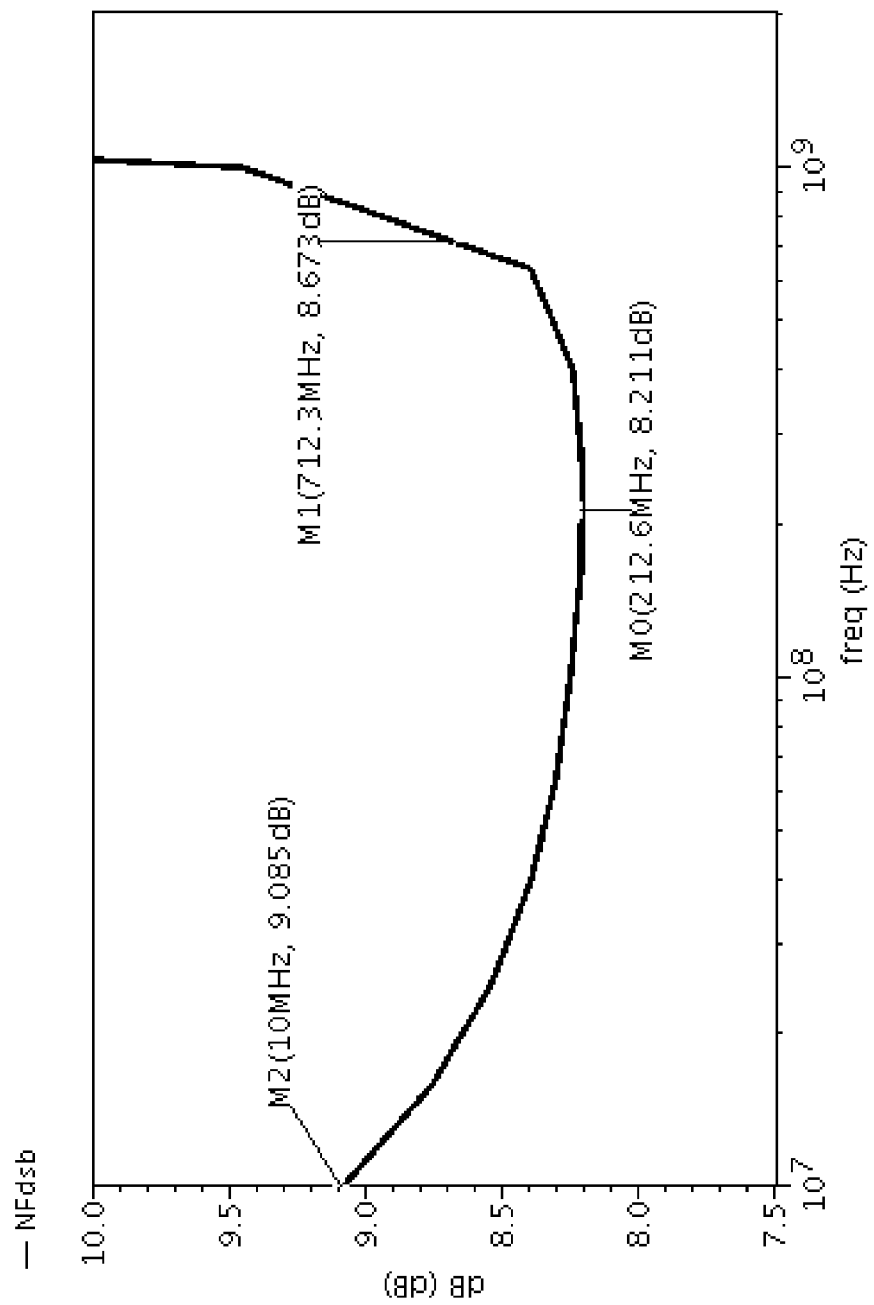
FIG. 8 plots noise figure as a function of the baseband frequency.

The corresponding noise figure is shown in FIG. 8. As a comparison, with the cascade analysis from the architectural study, the noise figure after the lowpass filter output was found to be 8 dB. This number includes a loss of 4.5 dB in the antenna interface, a noise figure reduction of 6 dB due to the combination of the four antenna paths and 1 dB due to the contribution of phase noise. Compensating for these effects, which are not in our circuit-level simulations, we would have a value from the cascade analysis of 8 dB−4.5 dB+6 dB−1 dB=8.5 dB. This is a good correspondence with the results of FIG. 8.

The third-order input-referred intercept point IIP3 with this gain setting is −28 dBm.

Figure 9:
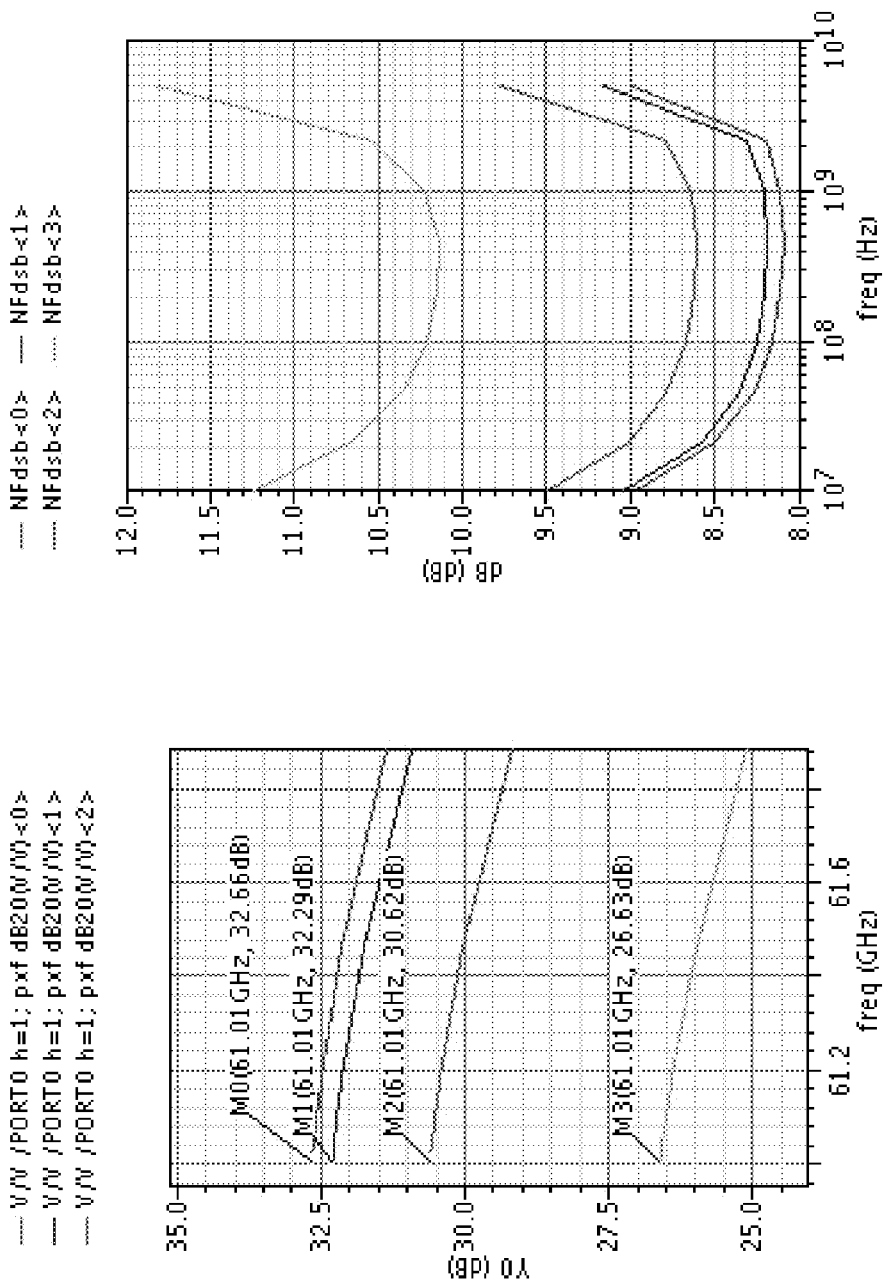
FIG. 9 plots gain (left) and noise figure (right) as a function of frequency and for different LO amplitudes.

With the same gain settings, the gain and noise figure for different LO amplitudes is shown in FIG. 9.

Power Consumption

Figure 10:
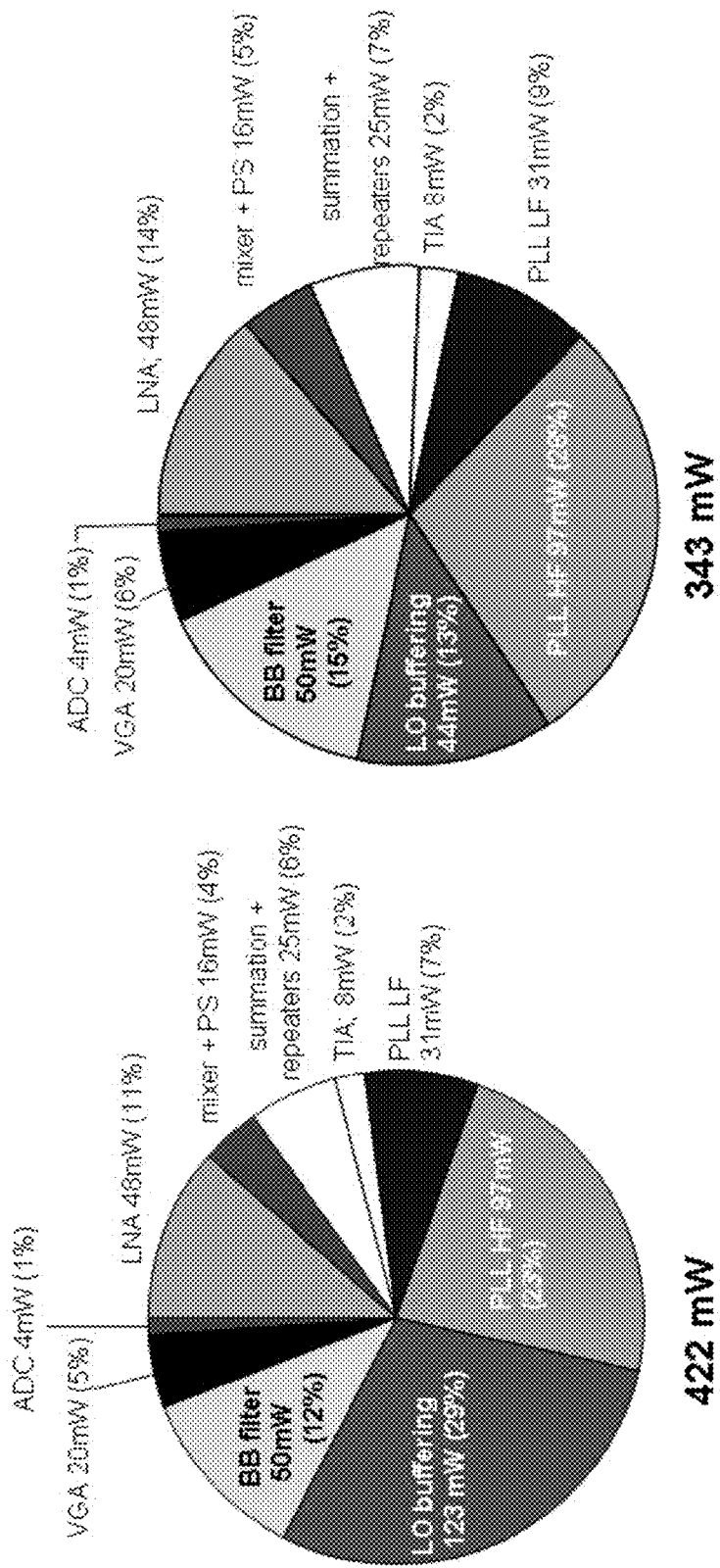
FIG. 10 shows a breakdown of the power consumption. Left: based on simulations of the chip. Right: idem except for the LO buffering.

The total chip consumes 398 mW. To complete this to a whole receiver, we add an estimate for the power consumption of the VGAs in the I-path and the Q-path (10 mW×2) as well as the simulated value of the ADCs in the I-path and the Q-path (0.85 µW/MHz per ADC). A pie chart of the power consumption of a complete 4-antenna receiver is shown in FIG. 10. The LO buffering consumes a large part, due to a wrong size of the transformer in the second stage of the buffer. With an optimized size of that transformer the power consumption of the LO buffers for PLL12 and PLL34 together can be reduced to 44 mW. This brings the complete power consumption to 343 mW.

The downconversion with the phase shifters and signal combiners together consume 49 mW. This is the total cost of the baseband beamforming (phase shifting and signal combination). This type of beamforming requires less power consumption than phase shifting in the LO path combined with signal combination at baseband. Indeed, from a 45 nm design of a 4-antenna receiver with the same RF section, the same PLL (but only one PLL) but using phase shifting in the LO path, we find a power consumption for the phase shifters in the LO path (around 60 GHz) of 46 mW for four antenna paths, which is almost as much as the baseband phase shifting and signal combination together.

Floorplan and Layout Description

Figure 11:
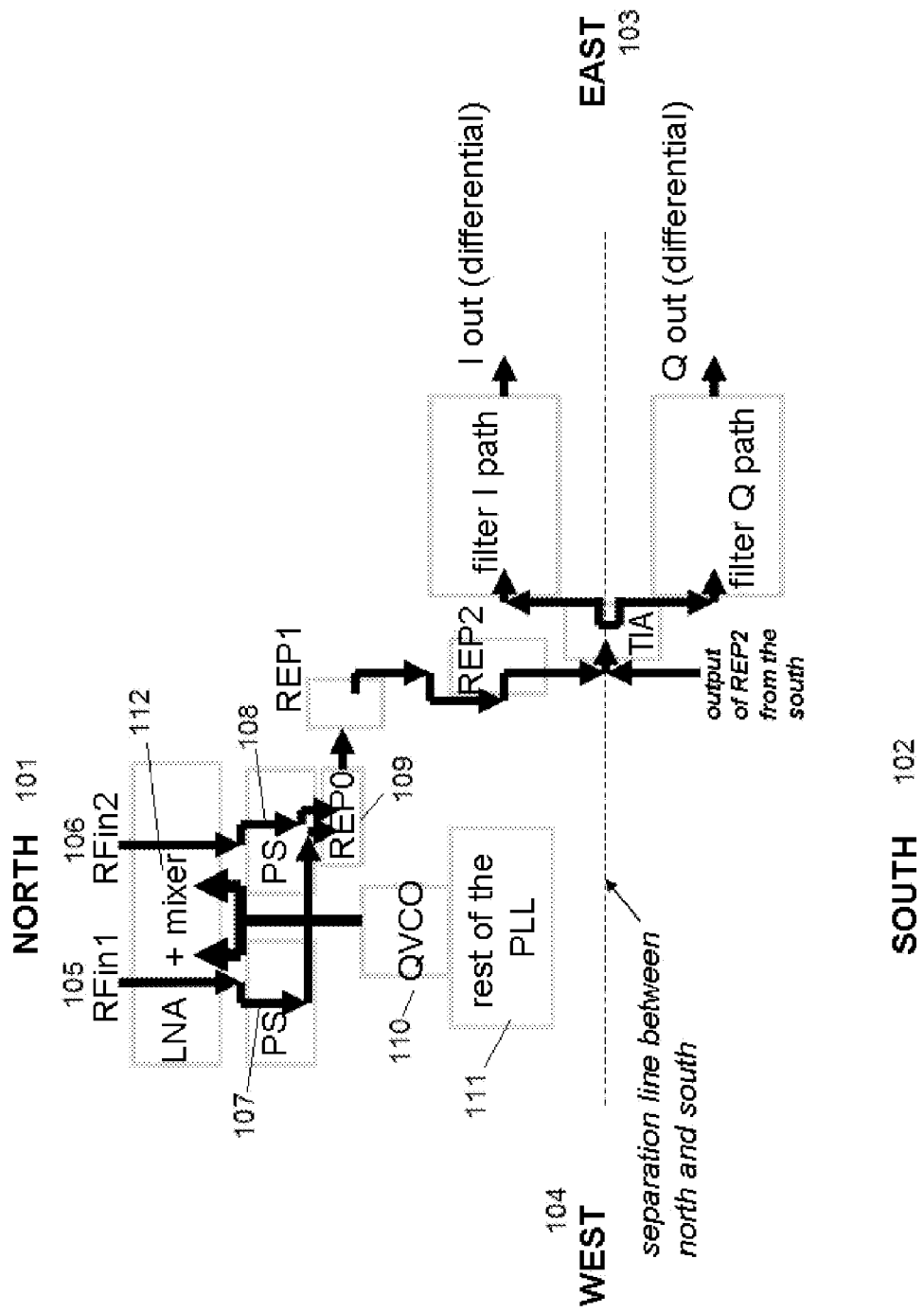
FIG. 11 shows a floorplan of a part of the chip.

The floorplan of the four-antenna implementation in 40 nm CMOS is shown in FIG. 11. The RF inputs are brought on the chip via the northern (101) and the southern edges (102). The baseband outputs are located at the east side (103) of the chip. This allows extending the chip in the eastern direction with analog-to-digital converters and eventually a digital part. The western edge (104) of the chip is reserved for digital control inputs (the connections for the NOC), the reference frequency input for the PLL and some other low-frequency control data.

The summation of the antenna paths 1 (105) and 2 (106) is performed by connecting together the output lines from the two phase shifters (107), (108), and feeding the result to a first current amplifier (109), referred to as "REP0" in FIG. 11.

With this floorplan the signal flow from RF to baseband has to take a bend of 90 degrees from the north-south direction to the east. This bend is taken at baseband and not at RF such that it does not give too many signal degradations or imbalances between the four signal lines (I+, I−, Q+, Q−).

The routing of the four phases of the QVCO (110) output around 60 GHz is shorter, thanks to the use of two PLLs (111) instead of one central PLL. In the actual 40 nm CMOS implementation the distance between a QVCO output and the corresponding mixer (112) inputs is about 300 micrometer. This distance is bridged by the LO buffering.

The architecture proposed here in combination with this type of floorplan is more attractive for a large number (>4) of antenna paths, compared to a floorplan where all RF inputs would be in line, located at one of the four sides, as the chip can be better contacted from two different sides.

Figure 12:
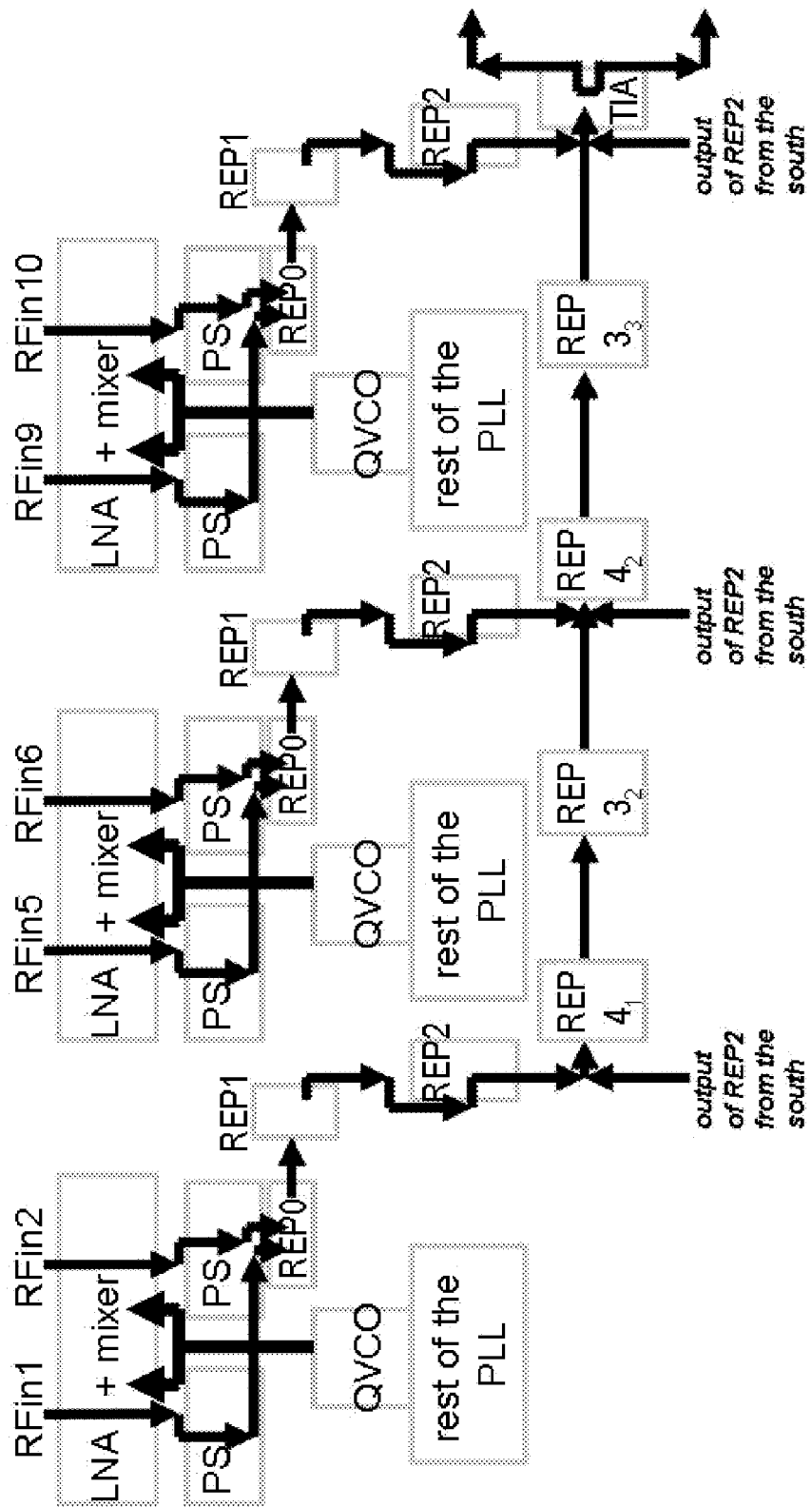
FIG. 12 shows a floorplan of a part of a twelve-antenna receiver.

An extension of the floorplan to more antenna paths is possible by putting sets of four antenna paths next to each other as shown in FIG. 12 for twelve antenna paths. Assume there are 4N antenna paths, divided into N sets of four antenna paths. We assume that the leftmost set (=the one at the largest distance from the baseband filters beyond the beamforming circuitry) has the index 1, while the rightmost set (=the one closest to the baseband filters beyond the beamforming circuitry) has the index N. The sets are combined as follows:

At the output of sets 1, . . . , N−1 we put a current amplifier, like the repeaters "REP0", "REP1" and "REP2" in FIG. 11. This current amplifier is referred to as "REP4i" in which i is an index ranging from 1 to N−1.

The current amplifier REP41 has two inputs, namely the outputs of the northern and southern REP2 cells of set 1.

In set i (i=2, . . . , N), the output of set i−1 must be routed to the east side of set i. In order to bridge this distance without much loss of performance, an extra repeater is provided, referred to as REP3i. For sets 2 to N−1 the output of REP3i is fed to REP4i, which has three current inputs, namely the output of REP3i and the outputs of the northern and southern REP2 cells of set i. The output of set N is a transimpedance amplifier (like TIA in FIG. 11), which has three current inputs, namely the output of REP3N and the outputs of the northern and southern REP2 cells of set N.

When putting several current amplifiers in cascade, the bandwidth of the cascade connection is smaller than the bandwidth of one single current amplifier. However, simulations have shown that this is not a problem to obtain a 1.75 GHz bandwidth, which is needed for bonding of two channels.

The implementation shown in FIG. 12 performs the signal combination at baseband while bridging the interconnect distance between the signal lines of the different antenna paths at baseband, using low-input impedance current amplifiers that lead to a high bandwidth despite the parasitic capacitance of the interconnect between the repeaters.

The invention claimed is:

1. An extremely high frequency wireless communication receiver, comprising:
  a phased array radio configured to receive a plurality of incoming signals in a predetermined frequency band, wherein the predetermined frequency band has a low frequency limit approximately equal to 30 GHz and wherein the phased array radio comprises:
  (i) a plurality of antenna paths, wherein each antenna path is configured to handle one of the incoming signals and form a differential I/Q output signal from the incoming signal, and wherein each antenna path comprises (a) I and Q branches with a downconversion part configured to downconvert the incoming signal to a baseband, and (b) a phase-shifting part configured to apply a controllable phase shift to the incoming signal of each antenna path, such that the differential I/Q output signals formed by the plurality of antenna paths are synchronized with each other;
  (ii) a signal combination circuit connected to the antenna paths and configured to combine the differential I/Q output signals into a combined differential I/Q output signal; and (iii) control circuitry connected to the phase-shifting part of the antenna paths and configured to control the controllable phase shift,
wherein each phase shifting part comprises a baseband part downstream from the downconversion part, and a set of variable gain amplifiers configured to assign controllable gains to each of the downconverted incoming signals in the I branch and the Q branch, and
wherein the control circuitry is configured to assign the controllable gains of the variable gain amplifiers based on coefficients of a rotational matrix, wherein the coefficients of the rotational matrix are determined based on the phase shift to be applied to each incoming signal.

2. The extremely high frequency wireless communication receiver of claim 1, wherein the rotational matrix comprises:

$$\begin{bmatrix} I' \\ Q' \end{bmatrix} = \begin{bmatrix} A\cos(\varphi) & -A\sin(\varphi) \\ A\sin(\varphi) & A\cos(\varphi) \end{bmatrix} \times \begin{bmatrix} I \\ Q \end{bmatrix};$$

and
wherein I comprises an in-phase signal, Q comprises a quadrature signal, and I and Q together comprise the respective downconverted incoming signal in the I/Q branches of the respective antenna path;
wherein I' comprises an in-phase signal, and Q' comprises a quadrature signal and I' and Q' together comprise the phase-shifted, differential I/Q output signal of the respective antenna path;
wherein A comprises a common scale factor for adding gain to the respective incoming signal; and
wherein φ comprises the phase shift to be applied to the respective incoming signal.

3. The extremely high frequency wireless communication receiver of claim 1, wherein the downconversion part is a direct downconversion part configured to downconvert the incoming signal to the baseband in a single step.

4. The extremely high frequency wireless communication receiver of claim 1, wherein the phased array radio comprises a plurality of phase-locked loops synchronized with each other, wherein each phase-locked loop is communicatively coupled to the downconversion part of at least one antenna path and wherein each phase-locked loop is configured to provide a local oscillation signal for the at least one antenna path.

5. The extremely high frequency wireless communication receiver of claim 4, wherein each phase-locked loop is communicatively coupled to the downconversion part of at least two antenna paths.

6. The extremely high frequency wireless communication receiver of claim 1, wherein the signal combination circuit comprises signal repeaters between the antenna paths.

7. The extremely high frequency wireless communication receiver of claim 6, wherein the signal repeaters are current amplifiers.

8. The extremely high frequency wireless communication receiver of claim 1, wherein the extremely high frequency wireless communication receiver is configured for adaptive vector orthogonal frequency division multiplexing communication within a predetermined frequency band, wherein the predetermined frequency band comprises a 7 GHz-wide band around approximately 60 GHz.

9. A method, comprising:
receiving a beam of incoming signals in the extremely high frequency band;
supplying the incoming signals to a plurality of antenna paths, wherein each antenna path is configured to handle one of the incoming signals and form a differential I/Q output signal from the incoming signal;
splitting each incoming signal to an I branch and a Q branch of each antenna path;
downconverting each incoming signal in the I branch and the Q branch to baseband;
thereafter applying a controllable phase shift to each incoming signal in the I branch and the Q branch, wherein applying the controllable phase shift comprises applying controllable gains to the respective downconverted incoming signals in the I branches and the Q branches, wherein the controllable gains comprise coefficients of a rotational matrix, and wherein the coefficients of the rotational matrix are determined based on the phase shift to be applied to each incoming signal;
controlling the controllable phase shift such that the differential I/Q output signals formed by the plurality of antenna paths are synchronized with each other; and
combining the differential I/Q output signals to a combined differential I/Q signal.

10. The method of claim 9, wherein applying the controllable phase shift comprises adding gain to the downconverted signal with a variable gain amplifier.

11. The method of claim 9, wherein the rotational matrix is given by:

$$\begin{bmatrix} I' \\ Q' \end{bmatrix} = \begin{bmatrix} A\cos(\varphi) & -A\sin(\varphi) \\ A\sin(\varphi) & A\cos(\varphi) \end{bmatrix} \times \begin{bmatrix} I \\ Q \end{bmatrix};$$

wherein I comprises an in-phase signal, Q comprises a quadrature signal, and I and Q together comprise the respective downconverted incoming signal in the I/Q branches of the respective antenna path;
wherein I' comprises an in-phase signal, and Q' comprises a quadrature signal and I' and Q' together comprise the phase-shifted, differential I/Q output signal of the respective antenna path;
wherein A comprises a common scale factor for adding gain to the respective incoming signal; and
wherein φ comprises the phase shift to be applied to the respective incoming signal.

12. The method of claim 9, wherein downconverting each incoming signal is performed in a single step.

13. The method of claim 9, further comprising providing local oscillation signals in a differential I/Q format to a downconversion part performing the downconversion of the incoming signals, wherein the local oscillation signals are generated with multiple synchronized phase-locked loops.

14. The method of claim 13, wherein each phase-locked loop is connected to the downconversion part of at least two antenna paths.

15. The method of claim 9, further comprising determining the controllable phase shift to be applied to each of the antenna paths.

16. A phased array radio comprising:
a plurality of antenna paths configured to receive a plurality of incoming signals in a predetermined frequency band having a low frequency limit approximately equal to 30 GHz, wherein each antenna path is configured to handle one of the incoming signals and form a differential I/Q output signal from the incoming signal, and wherein each antenna path comprises:

(a) I and Q branches with a downconversion part configured to downconvert the incoming signal to a baseband, and (b) a phase-shifting part configured to apply a controllable phase shift to the incoming signal of each antenna path, such that the differential I/Q output signals formed by the plurality of antenna paths are synchronized with each other;

a signal combination circuit connected to the antenna paths and configured to combine the differential I/Q output signals into a combined differential I/Q output signal; and control circuitry connected to the phase-shifting part of the antenna paths and configured to control the controllable phase shift, wherein each phase shifting part comprises a baseband part downstream from the downconversion part, and a set of variable gain amplifiers configured to assign controllable gains to each of the downconverted incoming signals in the I branch and the Q branch, and wherein the control circuitry is configured to assign the controllable gains of the variable gain amplifiers based on coefficients of a rotational matrix, wherein the coefficients of the rotational matrix are determined based on the phase shift to be applied to each incoming signal.

17. The phased array radio of claim 16, wherein the rotational matrix comprises:

$$\begin{bmatrix} I' \\ Q' \end{bmatrix} = \begin{bmatrix} A\cos(\varphi) & -A\sin(\varphi) \\ A\sin(\varphi) & A\cos(\varphi) \end{bmatrix} \times \begin{bmatrix} I \\ Q \end{bmatrix};$$

and wherein I comprises an in-phase signal, Q comprises a quadrature signal, and I and Q together comprise the respective downconverted incoming signal in the I/Q branches of the respective antenna path;

wherein I' comprises an in-phase signal, and Q' comprises a quadrature signal and I' and Q' together comprise the phase-shifted, differential I/Q output signal of the respective antenna path;

wherein A comprises a common scale factor for adding gain to the respective incoming signal; and wherein $\phi$ comprises the phase shift to be applied to the respective incoming signal.

18. The phased array radio of claim 16, wherein the downconversion part is a direct downconversion part configured to downconvert the incoming signal to the baseband in a single step.

19. The phased array radio of claim 16, wherein the phased array radio is included in an extremely high frequency wireless communication receiver.

20. The phased array radio of claim 19, wherein the extremely high frequency wireless communication receiver is configured for adaptive vector orthogonal frequency division multiplexing communication within a predetermined frequency band, wherein the predetermined frequency band comprises a 7 GHz-wide band around approximately 60 GHz.

* * * * *

UNITED STATES PATENT AND TRADEMARK OFFICE
CERTIFICATE OF CORRECTION

PATENT NO. : 8,532,226 B2  Page 1 of 1
APPLICATION NO. : 13/380135
DATED : September 10, 2013
INVENTOR(S) : Piet Wambacq It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 128 days.

Signed and Sealed this
Fifteenth Day of September, 2015

Michelle K. Lee
*Director of the United States Patent and Trademark Office*